Patented Mar. 24, 1942

UNITED STATES PATENT OFFICE 2,277,093

TREATMENT OF ARTIFICIAL TEXTILE MATERIALS

Donald Finlayson and Richard Gilbert Perry, Spondon, near Derby, England, assignors to Celanese Corporation of America, a corporation of Delaware No Drawing. Application July 24, 1940, Serial No. 347,300. In Great Britain August 29, 1939

6 Claims. (Cl. 8—131)

This invention relates to the treatment of artificial textile materials, and more particularly to processes for improving the properties of artificial fibres, filaments, threads, yarns, fabrics, ribbons and the like made of or containing an organic derivative of cellulose.

It has been found that the properties of artificial textile materials made of or containing an organic derivative of cellulose may be greatly improved by treating them in the substantial absence of tension with media containing, as the active agent, an aliphatic aldehyde and, as diluent, water and/or an organic hydroxyl-containing compound.

Acetaldehyde is a particularly important example of the active agents which may be employed according to the invention. Other examples are the simple aliphatic aldehydes such as, for example, formaldehyde, propaldehyde and butaldehydes. Substituted aldehydes, e. g. chloracetaldehyde, are also suitable for use according to the invention, but it is generally preferred to employ aldehydes which contain not more than one halogen atom in the molecule. Although the aldehydes which are preferred contain only one aldehyde radicle, polyaldehydes, e. g. glyoxal and succin-di-aldehyde, may be employed. Aldehydes of the classes exemplified above are referred to in the claims as "lower aliphatic aldehydes." The active agent may comprise two or more aldehydes in admixture. Moreover, the treatment media may contain, in addition to the aldehyde or aldehydes, other active agents, particularly latent solvents, e. g. ethyl acetate, methylene chloride and ethylene chloride. By a "latent solvent" for a cellulose derivative, as the term is employed in the present specification, is meant an agent which at least at ordinary temperatures is incapable of dissolving the cellulose derivative but which is capable of swelling the cellulose derivative to a high degree and which, when mixed with a comparatively small proportion of another suitable liquid, becomes a solvent for the cellulose derivative.

Among the organic hydroxyl-containing compounds which may be employed as diluents, it is preferred to employ simple aliphatic monohydric alcohols, such as, for example, methyl and ethyl alcohols and their homologues. Other organic hydroxylic compounds such as, for example, the polyhydric alcohols, e. g. glycol and glycerol, which are substantially without action on the treated materials, may also be employed. Such diluents may be employed in admixture with each other and/or with water and if desired other diluents may be admixed therewith. For example, in addition to the hydroxyl-containing compounds, benzene, toluene and other cyclic hydrocarbons, benzine, petroleum ether and other aliphatic hydrocarbons, or halogenated compounds may be employed in suitable proportions such that a homogeneous mixture may be produced with the other constituents of the treatment medium, provided that these additional diluents are inert, or substantially inert, towards the cellulose derivatives.

The particular active agent, the concentration in which it is employed, and the temperature of treatment, will depend upon the particular cellulose derivative which is present in the filaments or other materials being treated, upon the physical characteristics of those materials, and upon the degree of modification of the physical characteristics which is desired.

By treating cellulose derivative filaments, threads, yarns, fabrics, ribbons and the like with treatment media according to the invention in the substantial absence of tension, there may be produced a considerable increase in the extensibility of the materials. Preferably the treatment medium is applied while the cellulose derivative materials are under no tension or under so slight a tension that they are substantially free to shrink under the influence of the treatment media. If, however, the medium is applied while the materials are under relatively high tension, the tension should subsequently be reduced or removed so that the materials are allowed to shrink while they are still under the influence of the medium.

Advantageously, shrinkage of continuous filamentary materials or the like effected according to the invention is restricted to a small percentage. For example, when treating materials of low extensibility it may be limited to about 1-2%, while with materials of normal extensibility it may be up to about 10-12 or 15%. Shrinkage may be restricted by suitably modifying the treatment medium as regards composition, concentration and/or temperature, and/or by treating the materials while they are under sufficient tension to prevent more than the desired shrinkage. When the second of these methods is employed, the tension should be maintained so long as the materials remain under the influence of the active agent.

A satisfactory increase in extensibility in filaments and like textile materials which have a basis of acetone-soluble cellulose acetate can, for example, be secured by treating the materials in the absence of tension with a medium consisting of 10-20% by volume of acetaldehyde in ethyl alcohol at ordinary temperatures. Other concentrations may be employed, e. g. concentrations down to 5% or up to 25 or 30%, depending upon the precise results desired, and temperatures ranging from, for example, −5 to +50° C. or even more are found suitable according to the concentration and nature of the treatment media.

The treatment media according to the invention may be employed in any of the methods described, for example, in U. S. Patents Nos. 2,070,583 and 2,058,422. The invention is most advantageously applied to filaments, threads, fibres, yarns, fabrics, ribbons and the like containing or derived from high tenacity wet-spun materials or materials which have been stretched to 200% or more of their original length in hot water or wet steam or in a medium containing an organic solvent or swelling agent. However, the invention is not limited to the treatment of these materials but is applicable generally to organic derivative of cellulose materials the extensibility of which it is desired to increase.

The treatment media according to the invention may be also employed to produce substantial improvements in the properties of staple fibres having a basis of an organic derivative of cellulose. Thus, staple fibres in the form of a sliver or roving or of a loose mass of fibres or in any other condition in which they are substantially free to contract may be treated according to the invention to produce a crinkled or crimped effect which greatly enhances their spinning qualities. The crinkle or crimp resulting in staple fibres which have been produced by cutting operations from continuous filamentary materials is particularly satisfactory. The invention is of particular value, for example, when applied to staple fibres which have been produced by cutting filamentary materials which have been stretched to increase their tenacity, for example as described above.

The composition of the treatment medium and its temperature may be varied according to the degree of crimp or crinkle desired. In general, media similar to those described above with reference to shrinkage will be found most advantageous, especially a medium consisting of 10–15% by volume acetaldehyde in ethyl alcohol. Temperatures of the order of 20–25° C. are preferred, the degree of crinkle increasing with rise of temperature.

The fibres are preferably crinkled by immersing them in the treatment medium until a sufficient degree of crinkle has been secured, e. g. for 10 to 20 minutes. Advantageously the fibres are agitated during or throughout the treatment. After treatment the medium may be run off from the fibres and the latter dried by evaporation, e. g. in a stream of warm air, due regard being paid to the nature of the active agent and of any diluents employed so that adhesion of the fibres to each other is avoided. Alternatively, the fibres may be freed from adhering medium by washing with an inert liquid with which it is miscible, e. g. one or more of the diluents present in the medium.

After the staple fibres have been freed or substantially freed from treatment medium they may be carded, if necessary, and then spun into yarn by any suitable method. Preferably conditioning and/or de-electrifying agents are applied to the fibres before carding and spinning so as to facilitate these operations. Such agents may be, for example, hygroscopic polyhydric alcohols or hygroscopic salts.

The invention is of the greatest importance in connection with the treatment of materials having a basis of acetone-soluble cellulose acetate to which reference has been made above. However, materials made from other cellulose acetates or from other esters of cellulose such as, for example, cellulose formate, cellulose propionate and cellulose butyrate, and mixed esters, e. g. cellulose aceto-propionate and aceto-butyrate, and also from cellulose ethers, e. g. methyl, ethyl and benzyl cellulose or from cellulose ether esters, may be treated.

The following examples illustrate the invention:

Example 1

Hanks of dry-spun cellulose acetate yarn which has been stretched in wet steam to 500% of its original length are freely suspended in a bath of 20% acetaldehyde and 80% ethyl alcohol at 25° C. for 10 minutes. The hanks are then withdrawn from the bath, washed thoroughly with alcohol and with water, and dried in a current of air at about 70° C. They are found to be evenly shrunk to a small extent and to possess a substantially increased extensibility.

Example 2

A mass of irregularly disposed staple fibre, produced from dry-spun filaments which have a basis of cellulose acetate and which have been stretched in wet steam to 400% of their original length, is agitated in a bath of 10% acetaldehyde and 90% ethyl alcohol at 20° C. for 15 minutes. The liquor is then run off from the fibres, and the fibres lightly squeezed between rollers to remove excess liquor. After thoroughly washing with alcohol and with water and drying in a current of warm air, the fibres are found to possess a very satisfactory crinkle which makes them readily spinnable into good strong yarns.

Having described our invention, what we desire to secure by Letters Patent is:

1. Process for crimping artificial staple fibre made of or containing an organic derivative of cellulose, which comprises subjecting the fibres, while they are substantially free to contract, to the action of a shrinking medium containing acetaldehyde and a diluent selected from the group consisting of water and alcohols.

2. Process for crimping artificial staple fibre made of or containing an organic derivative of cellulose, which comprises subjecting the fibres while they are substantially free to contract, to the action of a shrinking medium containing acetaldehyde and ethyl alcohol.

3. Process for crimping artificial staple fibre made of or containing cellulose acetate, which comprises subjecting the fibres while they are substantially free to contract, to the action of a shrinking medium containing acetaldehyde and ethyl alcohol.

4. Process for crimping artificial staple fibre made of or containing cellulose acetate, which comprises subjecting the fibres, while they are substantially free to contract, to the action of a shrinking medium consisting of 10 to 20% acetaldehyde and 90 to 80% ethyl alcohol.

5. Process for crimping artificial staple fibre made of or containing cellulose acetate, which comprises subjecting the fibres while they are substantially free to contract, to the action of a shrinking medium containing acetaldehyde, a latent solvent for the cellulose acetate and ethyl alcohol.

6. Process for crimping artificial staple fibre made of or containing cellulose acetate, which comprises subjecting the fibres which have a high tenacity while they are substantially free to contract, to the action of a shrinking medium containing acetaldehyde and ethyl alcohol.

DONALD FINLAYSON.
RICHARD GILBERT PERRY.